United States Patent
Hall et al.

(10) Patent No.: US 7,093,654 B2
(45) Date of Patent: Aug. 22, 2006

(54) DOWNHOLE COMPONENT WITH A PRESSURE EQUALIZATION PASSAGEWAY

(75) Inventors: David R. Hall, Provo, UT (US); David S. Pixton, Lehi, UT (US); Scott Dahlgren, Provo, UT (US); Jay T. Reynolds, West Provo, UT (US); James W. Breihan, Houston, TX (US); Michael A. Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 152 days.

(21) Appl. No.: 10/710,586

(22) Filed: Jul. 22, 2004

(65) Prior Publication Data

US 2006/0016590 A1    Jan. 26, 2006

(51) Int. Cl.
*E21B 17/02* (2006.01)

(52) U.S. Cl. ............... 166/242.6; 166/65.1; 175/320; 285/333; 339/194; 339/195

(58) Field of Classification Search ............ 175/40, 175/104, 320; 166/65.1, 242.6; 340/854.4, 340/855.1; 174/47, 75 R–75 C; 439/191, 439/194, 195; 285/333; 324/347; 336/90, 336/92

See application file for complete search history.

(56) References Cited

U.S. PATENT DOCUMENTS

| | | | |
|---|---|---|---|
| 2,414,719 A | 1/1947 | Cloud | |
| 3,518,608 A * | 6/1970 | Papadopoulos | 175/104 |
| 4,445,734 A * | 5/1984 | Cunningham | 439/194 |
| 4,706,997 A | 11/1987 | Carstensen | |
| 4,739,325 A | 4/1988 | MacLeod | |
| 4,788,544 A | 11/1988 | Howard | |
| 5,964,486 A | 10/1999 | Sinclair | |
| 6,012,015 A | 1/2000 | Tubel | |
| 6,050,610 A | 4/2000 | Enderle | |
| 6,252,518 B1 | 6/2001 | Laborde | |
| 6,392,317 B1 | 5/2002 | Hall et al. | |
| 6,670,880 B1 | 12/2003 | Hall et al. | |
| 6,688,396 B1 * | 2/2004 | Floerke et al. | 166/65.1 |
| 6,717,501 B1 | 4/2004 | Hall et al. | |
| 6,722,706 B1 | 4/2004 | Church | |
| 6,799,632 B1 | 10/2004 | Hall et al. | |
| 6,821,147 B1 | 11/2004 | Hall et al. | |
| 6,830,467 B1 | 12/2004 | Hall et al. | |
| 6,844,498 B1 | 1/2005 | Hall et al. | |
| 6,866,306 B1 | 3/2005 | Boyle et al. | |
| 6,888,473 B1 | 5/2005 | Hall et al. | |

(Continued)

OTHER PUBLICATIONS

PCT/US 03/16475, Published Dec. 4, 2003, Applicant Baker Hughes; International Search Report: "Documents Considered to Be Relevant".

*Primary Examiner*—David Bagnell
*Assistant Examiner*—Matthew J. Smith
(74) *Attorney, Agent, or Firm*—Jeffrey E. Daly; Tyson J. Wilde; Cameron Sneddon (57) ABSTRACT

The present invention includes a downhole component adapted for transmitting downhole data. The downhole component includes a threaded end on a downhole component. The threaded end furthermore includes an interior region, and exterior region, and a mating surface wherein a cavity is formed. A data transmission element is disposed in the cavity and displaces a volume of the cavity. At least one passageway is formed in the threaded region between interior and exterior regions. The passageway is in fluid communication with both the interior and exterior regions and thereby relieves pressure build up of thread lubricant upon tool joint make up.

14 Claims, 9 Drawing Sheets

U.S. PATENT DOCUMENTS

| | | |
|---|---|---|
| 6,913,093 B1 * | 7/2005 | Hall et al. ................ 175/320 |
| 6,929,493 B1 | 8/2005 | Hall et al. |
| 6,945,802 B1 | 9/2005 | Hall et al. |
| 6,981,546 B1 * | 1/2006 | Hall et al. ................ 166/65.1 |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0048590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |

* cited by examiner

Fig. 10

DOWNHOLE COMPONENT WITH A PRESSURE EQUALIZATION PASSAGEWAY

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

For the past several decades, engineers have worked to develop apparatus and methods to effectively transmit information from components located downhole on oil and gas drilling strings to the ground's surface. Part of the difficulty comes from the fact that the operating environment for the transmission system can be extremely harsh, including temperatures as high as 200° C., pressures as high as 25,000 psi, and extremely abrasive and chemically corrosive conditions.

Another source of difficulty comes from the fact that a drill string may be made up of hundreds of components, such as sections of drill pipe and various downhole tools. Thus, if a data transmission system is integrated into each of these components, it must be capable of connections that can reliably transmit information across the joints among these components.

Moreover, since these components are connected serially to create the drill string that may stretch for thousands of feet below the earth's surface, reliability is imperative. A failure of a single component in the transmission system can bring the whole system down and require an expensive "roundtrip" of the drill string to replace the defective component.

This invention relates to oil and gas drilling and production, specifically downhole components that are part of a drill string and are adapted to house data transmission elements. Disclosed in U.S. Pat. No. 6,670,880, which is incorporated herein by reference, is such a downhole transmission system that transmits data through a string of downhole components. In one aspect of the '880 patent, each downhole component comprises a pin and a box end. The pin end of the downhole components are adapted to be connected to the box end of another downhole component. Each pin end comprises external threads tapering to a pin nose face, pin end secondary shoulder, or mating surface and each box end comprising internal threads tapering to an internal face, secondary shoulder, or mating surface. The pin nose face and the internal face are aligned with and proximate each other when the pin end of one component is threaded into a box end of another component. A data transmission element is located in a cavity in each pin and box end secondary shoulder, the data transmission element being part of the downhole transmission system.

In general, drilling mud or lubricants trapped within a void formed between the threads and secondary shoulders of the pin and box end of downhole components may create high pressure within this region of the tool joints during "make-up" of two drilling components, i.e. when two drilling components are torqued together. High-pressure potentially damages data transmission elements, sealing rings, or other devices disposed in cavities within the secondary shoulders of tool joints. Mud or lubricants on the tapered threads may result in a build up of pressure adjacent the transmission element or sealing ring when the downhole tool strings are made up. The high pressure may force such a device from its cavity and into the tool joint. When the shoulders of the pin and box end are brought together the dislodged device may be sandwiched between the pin and box end secondary shoulders and damaged. The damaged device may further complicate the operation of the downhole tool string by disrupting the transmission system and/or creating leaks paths to the external surface of the tool joint.

Further, torsional forces cause mechanical stress in tool joints. Trapped fluids between the faces of the pin end and the shoulder of the box end may increase the stress applied to the threaded portion or other components of these connections when under torsional stress. If a drill string encounters obstructions while drilling, additional torsional stress can be applied to the tool joints. Further, when drilling horizontally or when drilling through curved sections of the well bore the outer surface of the drill string may rub against the wall of the well bore. This creates additional friction, and passes even more torsional stress to the tool joints. Eliminating any fluids trapped in the void between the pin face and the shoulder face of the box end may prevent a build up of pressure which may lead to failure in certain functions of the tool joint such as data transmission, attachment, and the prevention of fluids leaking outside of the drill string.

In some circumstances the trapped fluid creates enough pressure while making up the tool string that the torque applied at the surface may not be enough to adequately attach the components of the tool string. Torque readings at the surface may indicate that the joint is fully established when in reality the actual torque additional torque is needed because of the resistance caused by the fluid in the tool joint. Further, the extreme temperature in the downhole environment of the well bore increases the temperature in the joint, which in turn increases the pressure within the joint as well.

Attempts to relieve pressure within tool joints of downhole tools strings are well known. U.S. Pat. No. 1,907,522 relates to improvements in joints for rods, more especially to sucker rods used for pumping oil. The '522 patent claims a sucker rod comprising a removable coupling comprising a rod having a socket and provided with a screw thread portion and having a plurality of grooves extending radially through the wall of the socket. The grooves allow for fluid to drain out of the tool joint and into an annulus of the rod.

U.S. Pat. No. 3,822,902 discloses a threaded connection for tubular goods including an externally threaded pin member, an internally threaded box member, and a resilient seal ring positioned between the pin and box members to provide a fluid seal therein. The threaded connection also includes a passage formed in either the pin or box member for conducting thread lubricant or other liquid away from the seal ring as the pin and box members are screwed together. The preferred embodiment of the '902 patent is a flow passage comprising a plurality of longitudinal grooves circumferentially spaced about the pin member and extending transversely though the treads thereof. The longitudinal grooves help prevent a buildup of pressure between the threads of the face of the pin end and the face of the shoulder within the box end of the threaded connection.

U.S. Pat. Nos. 4,750,761; 4,946,201; 6,050,610; 6,442, 826; and 6,550,821 disclose other variations of downhole tool joints comprising grooves to relieve pressure between the threads of the pin face and the shoulder face within the box end of downhole threaded connections.

However, specific problems associated with addressing the aforestated difficulties in relieving the pressure generated in connections by making up the joints and trapping the thread lubricant remain in systems having components disposed in cavities in the "pressure zone" have not been addressed by the prior art. These problems are particularly manifested in downhole networking systems employing data transmission elements disposed in cavities within the threaded connections and exposed to the trapped lubricant.

SUMMARY OF INVENTION

Disclosed is a downhole component adapted for transmitting downhole data. The component comprises a data transmission element and an elongate, generally tubular body with a threaded end. The threaded end has an interior region, an exterior region, and a mating surface. The component further comprises a cavity formed in the mating surface of the threaded end. The data transmission element is disposed in the cavity and at least partially displaces a volume of the cavity. At least one passageway is formed in the threaded end and allows fluid communication with the interior and exterior regions.

In an embodiment of the present invention a second passageway is formed in the threaded end and is in fluid communication with a passageway in the downhole component and at least one of the interior and exterior regions. Furthermore, the passageway is in fluid communication with the cavity and the interior region. Also disclosed is a downhole component wherein the passageway is in fluid communication with the cavity. A passageway may further be in fluid communication with the cavity, exterior region, and the interior region.

The transmission element is free to move within the parameters of the cavity. Typically the data transmission element is biased thus pushing it out of the cavity so as to allow physical contact with an adjacent transmission element proximate the end of an adjacent downhole component. It is believed that enough pressure may build up inside the cavity from lubricants used on the threaded end during make up of the downhole components, such that the transmission element may be damaged. It is believed that the passageways provide a pressure relief path for lubricants and other fluids to flow away from the transmission elements and threaded end; thereby, reducing pressure on the transmission elements.

It is preferred that fluid passes from the exterior region to the interior region, but fluid in the interior region may also pass into the exterior region.

In the context of the present specification, the term "downhole" is intended to have a relatively broad meaning, including such environments as drilling in oil and gas, gas and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

It should be further noted that by "mating surface," it is meant a surface on a downhole component intended to contact or nearly contact the surface of another downhole component, such as another section of drill pipe. For example, a mating surface can include threaded regions of a box end or pin end of drill pipe, primary or secondary shoulders designed to come into contact with one another, or other surfaces of downhole components that are intended to contact or come into close proximity to surfaces of other downhole components.

BRIEF DESCRIPTION OF DRAWINGS

The foregoing and other features of the present invention will become more fully apparent from the following description, taken in conjunction with the accompanying drawings. The invention will be described with additional specificity and detail through use of the accompanying drawings with the understanding that these drawings depict only typical embodiments in accordance with the invention and are therefore not to be considered limiting in scope.

DETAILED DESCRIPTION

The description of embodiments of the present invention, as represented by this specification and by the drawing figures, is not intended to limit the scope of the invention, but is merely representative of various selected embodiments of the invention. The embodiments of the invention will be best understood by reference to the drawings wherein like parts are designated by like numerals throughout.

A pressure equalization apparatus is disclosed as including a passageway in a threaded end of a downhole component 102. The downhole component 102 includes a data transmission element mountable proximate a mating surface of a downhole drilling component, such as a section of drill pipe.

Figure 1:
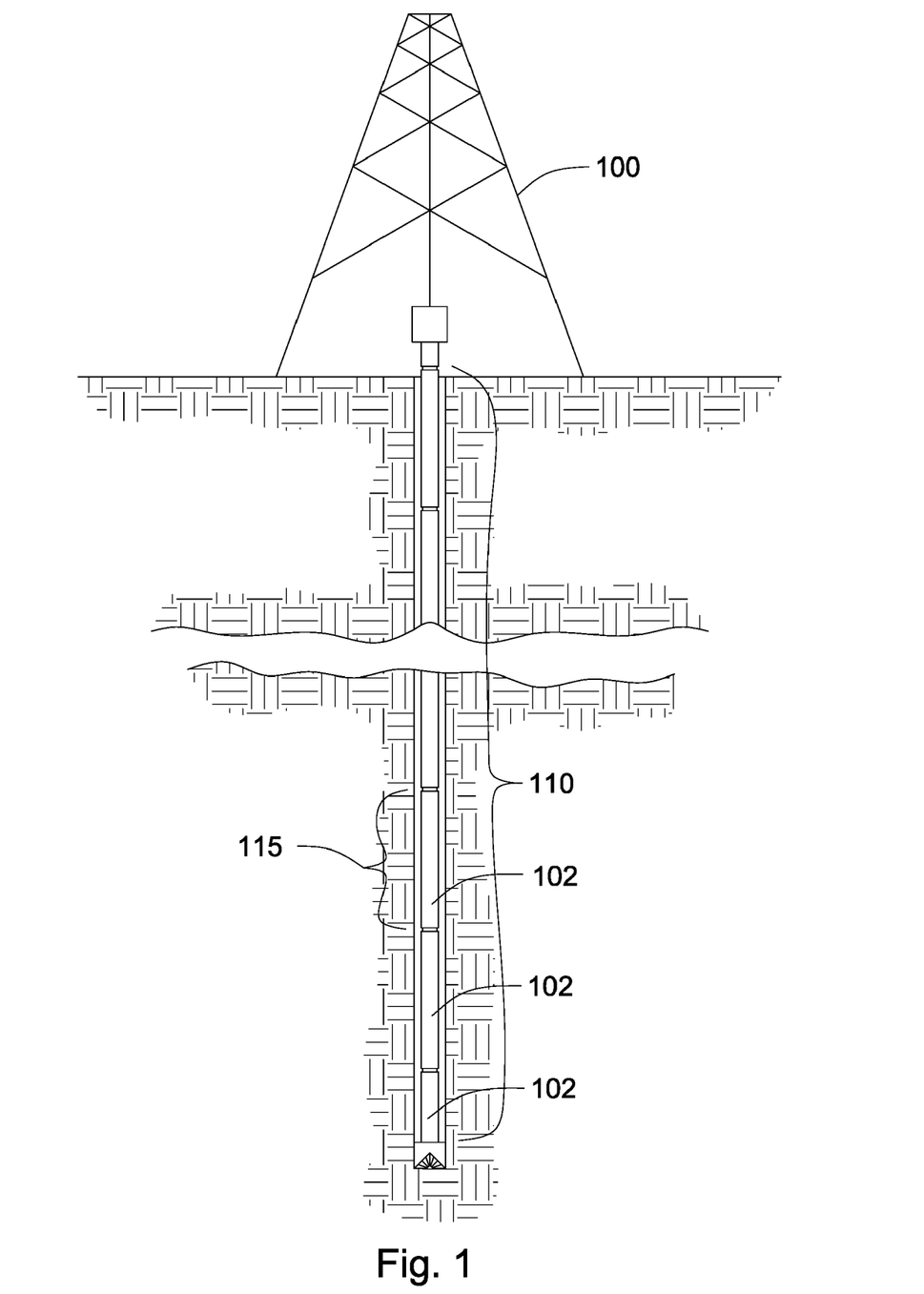
FIG. 1 is a schematic representation of a drill string as used on a drilling rig.

Referring to the drawings, FIG. 1 is a schematic representation of a drill string 110 in a borehole as used on a drilling rig 100 including downhole components 102 such as drill pipe 115. Some examples of downhole components 102 are drill collars, jars, heavy weight drill pipe, drill bits, and of course drill pipe.

Figure 2:
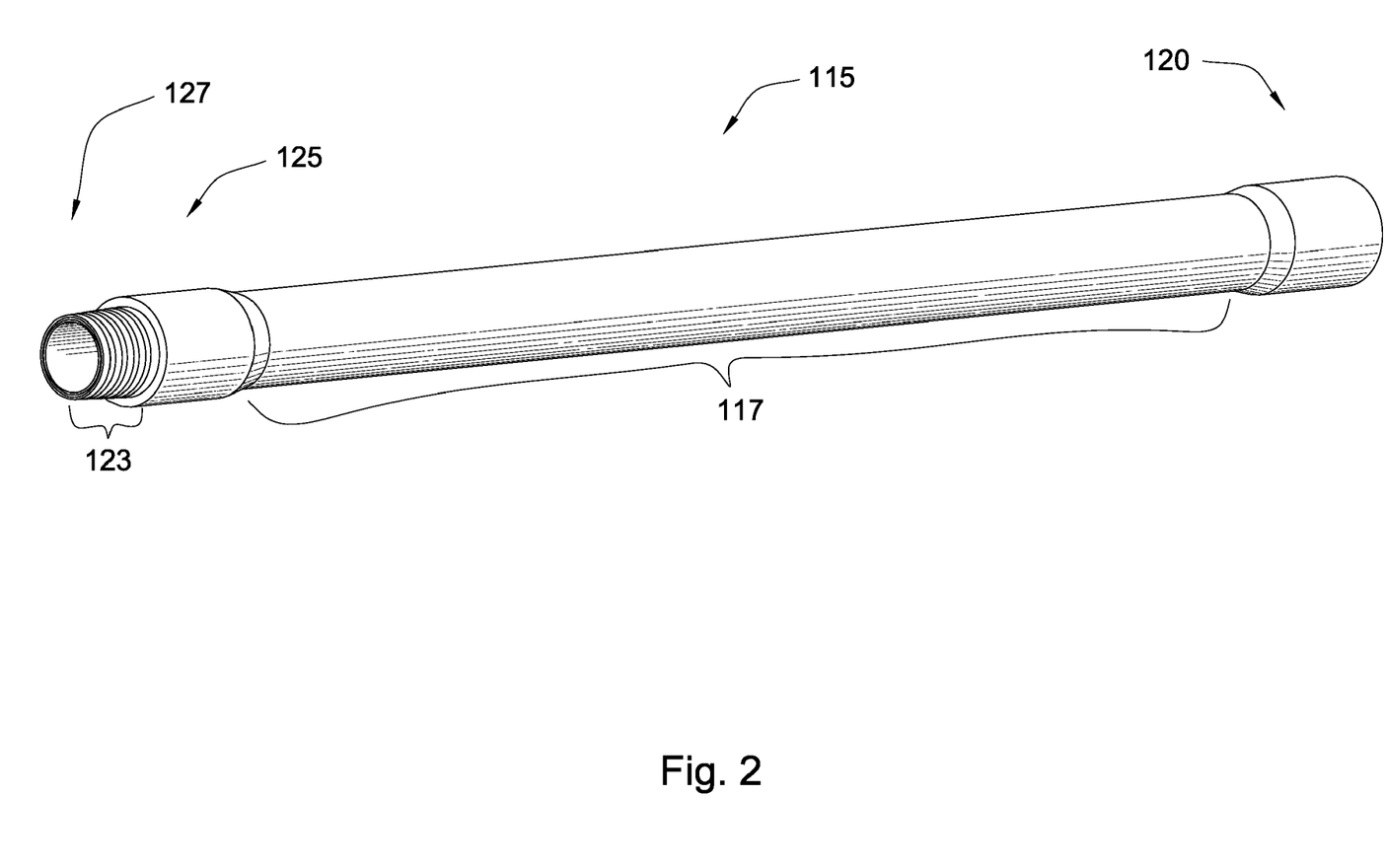
FIG. 2 is a perspective view a drill pipe.

FIG. 2 shows one example of a downhole component 102, made in accordance with the present invention. A drill pipe 115 is shown having a box end tool joint 120, pin end tool joint 125, pin nose 127, and an elongate, generally tubular body 117. Tool joints are attached to the drill pipe 115 or other components and provide threads, such as threaded end 123 on the pin nose 127, or other devices for attaching the tools together, and to allow a high torque to be applied to resist the forces present when making up a drill string or during drilling. Between the pin end 125 and box end 120 is the elongate, generally tubular body 117 of the drill pipe section. A typical length of the body is between 10 and 90 feet and usually about 30 feet. Drill strings in oil and gas production and exploration can extend as long as 20,000 feet, which means that as many as 700 sections of drill pipe 115 and downhole components 102 can be used in the drill string.

Figure 3:
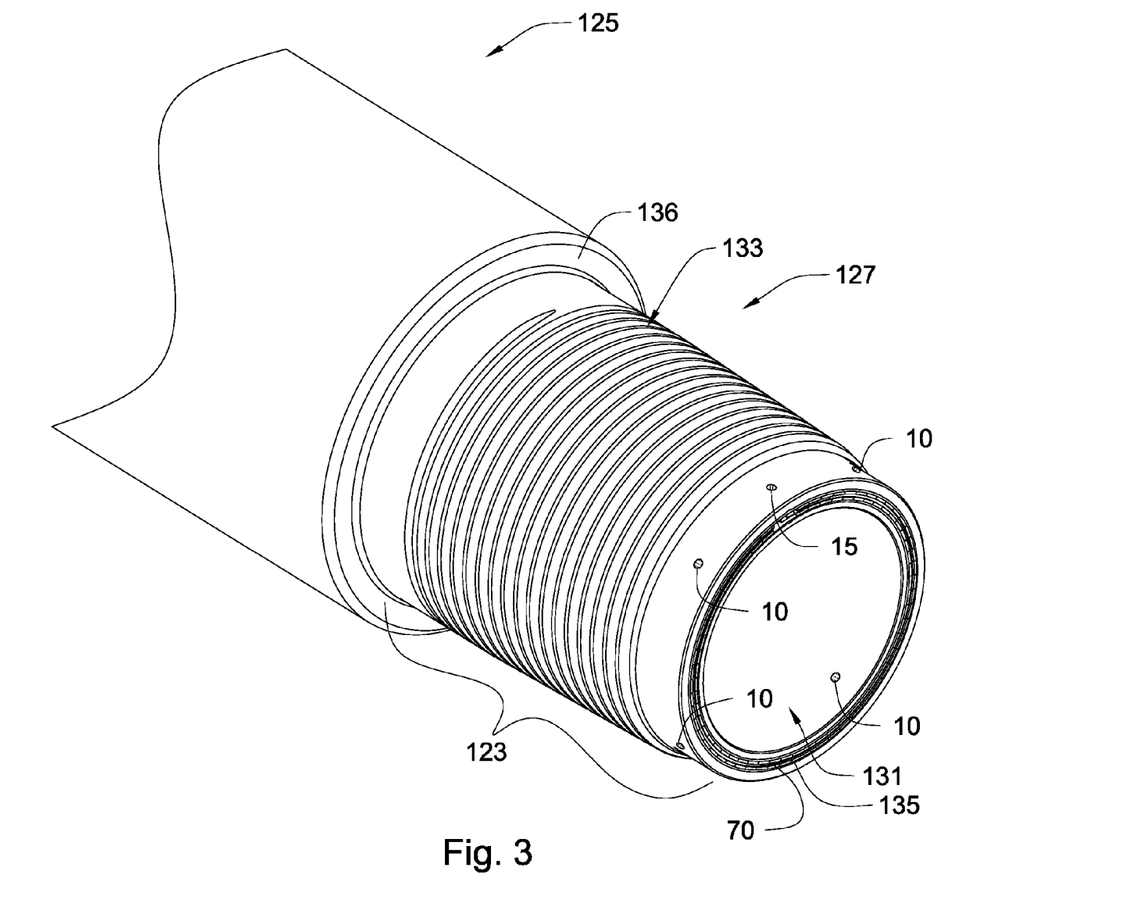
FIG. 3 is a close up view of the pin nose of the pin end tool joint of FIG. 2 illustrating the data transmission element retained within the pin end tool joint.
Figure 7:
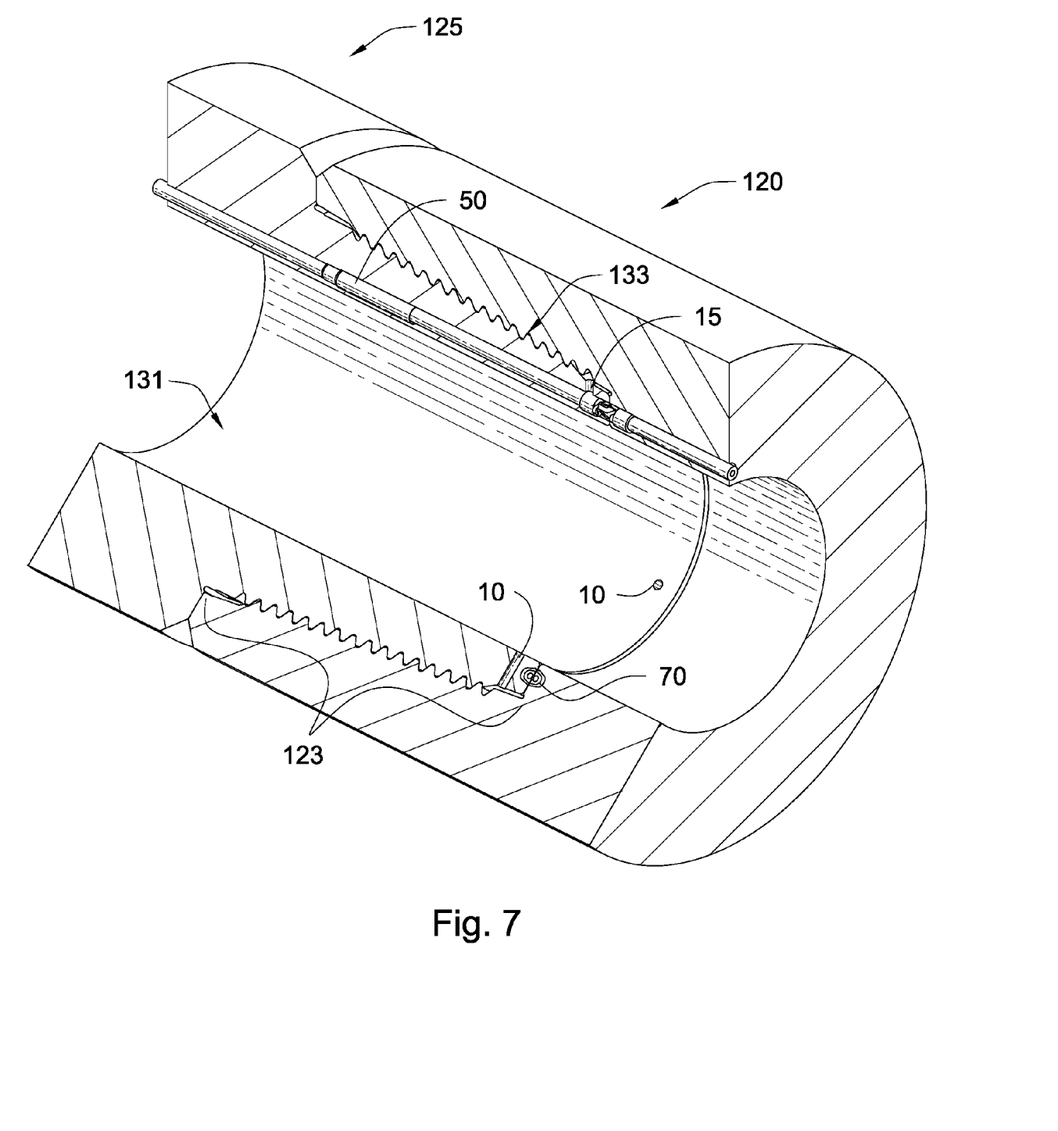
FIG. 7 is a cut away view of the present invention with a box and pin end "made-up" including the data transmission elements therebetween.

A close up of pin end tool joint 125 is shown in FIG. 3. The pin end 125 includes a threaded end 123 often referred to as the pin nose 127 section of the pin end 125. The threaded end 123 includes an interior region 131, and exterior region 133, a first mating surface 135 and a second mating surface 136. At least one passageway 10 is formed in the threaded end 123 is in fluid communication with the interior and exterior regions 131 and 133 respectively. Preferably more than one passageway 10 is formed in the threaded end 123 as shown in FIG. 3. A coaxial cable 50 (shown in FIG. 7) is disposed within the drill pipe running along the longitudinal axis of the drill pipe 115. The coaxial cable 50 includes a conductive tube and a conductive core within it (not shown). A data transmission element 70 is disposed in the pin nose 127 of pipe 115. A cavity 21 is formed in the first mating surface 135 of threaded end 123 of pin nose 127. As can be seen in FIG. 7, the box end 120 of pipe 115 depicts a similar placement of a mating data transmission element 70, in a similar cavity formed in the internal shoulder of the box end. The coaxial cable and data transmission element may also be disposed in other downhole components such drill collars, jars, and similar components that would be typically found in a drill string.

In one embodiment of the invention, a data transmission element 70 is configured to communicate with a corresponding data transmission element 70 located on another downhole component 102. The corresponding data transmission element 70 can likewise be mountable proximate a mating surface of the corresponding downhole component 102. In order to close gaps present between communicating surfaces of data transmission elements, data transmission elements are preferably biased with respect to the mating surfaces they are mounted on.

By "biased," it is meant, for the purposes of this specification and the appended claims, that a data transmission element is urged, by a biasing member, such as a spring or an elastomeric material, or by a "spring force" caused by contact between a data transmission element and a mating surface, in a direction substantially orthogonal to the mating surface. Thus, the term "biased" is not intended to denote a physical position of a data transmission element 70 with respect to a mating surface, but rather the condition of a data transmission element being urged in a selected direction with respect to the mating surface. The data transmission element may be positioned flush with, above, or below the mating surface. The data transmission elements are preferably biased in both the pin ends and box ends though the data transmission element may also be biased in only one end of a drilling component and not the other.

In another embodiment of the present invention, a cavity is formed in the mating surface of the threaded end of a drill component. A data transmission element is mounted or housed within the cavity. In selected embodiments, a cavity includes a locking mechanism to retain the data transmission element within the cavity. In certain embodiments, the locking mechanism is a locking shoulder shaped into the cavity. A data transmission element, once inserted into the cavity, slips past and is retained by the locking shoulder.

As described in related U.S. Pat. No. 6,670,880, the data transmission element 70 converts an electrical signal to a magnetic field or magnetic current. A corresponding data transmission element (not shown) in the box end 120 located proximate the data transmission element 70 when the box end and pin end are connected together, detects the magnetic field or current. The magnetic field induces an electrical current into the box end data transmission element that is transmitted to the coaxial cable located along the drill pipe 115 or other downhole component.

Figure 4:
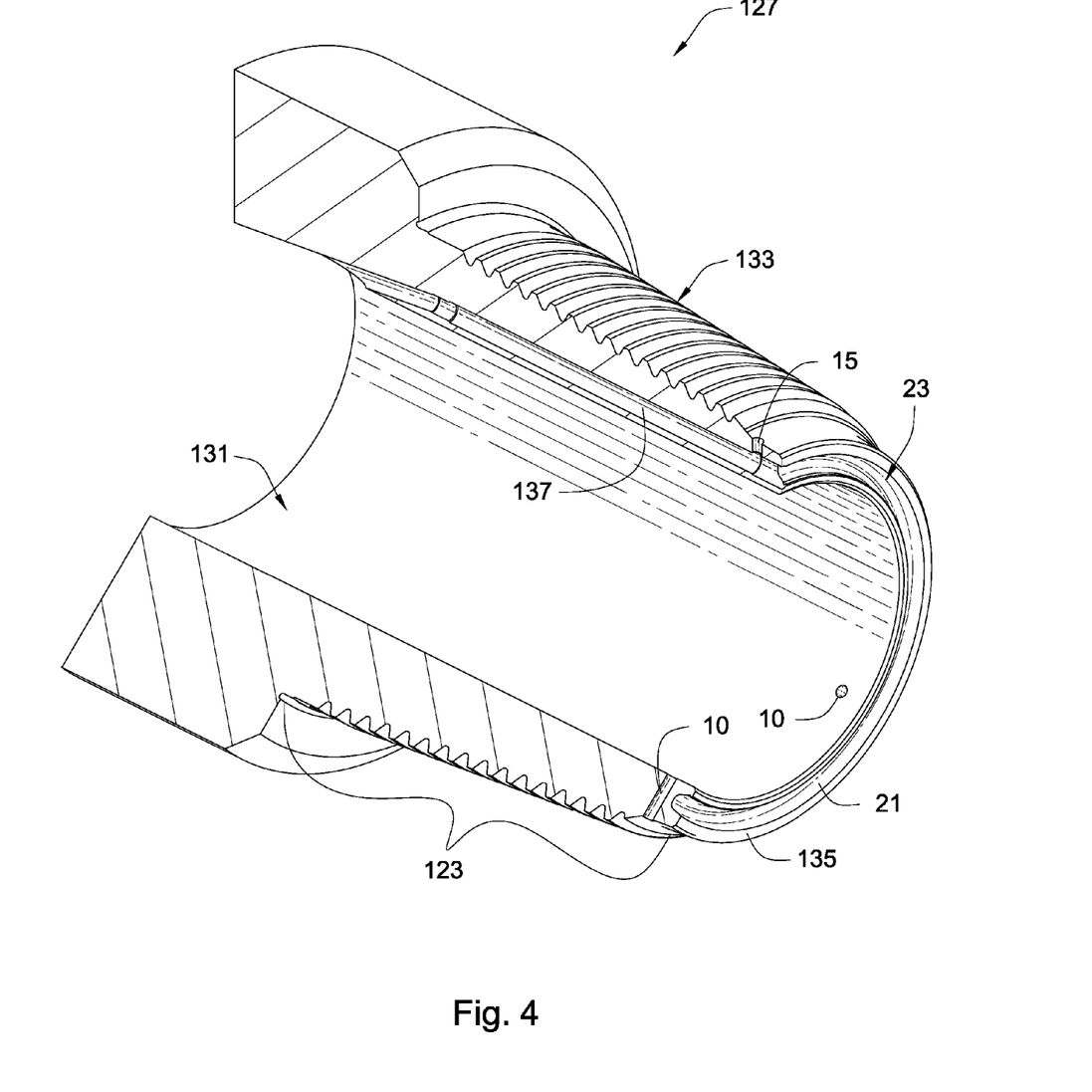
FIG. 4 is a cut away view illustrating from the pin end of the tool joint without the data transmission element.
Figure 5:
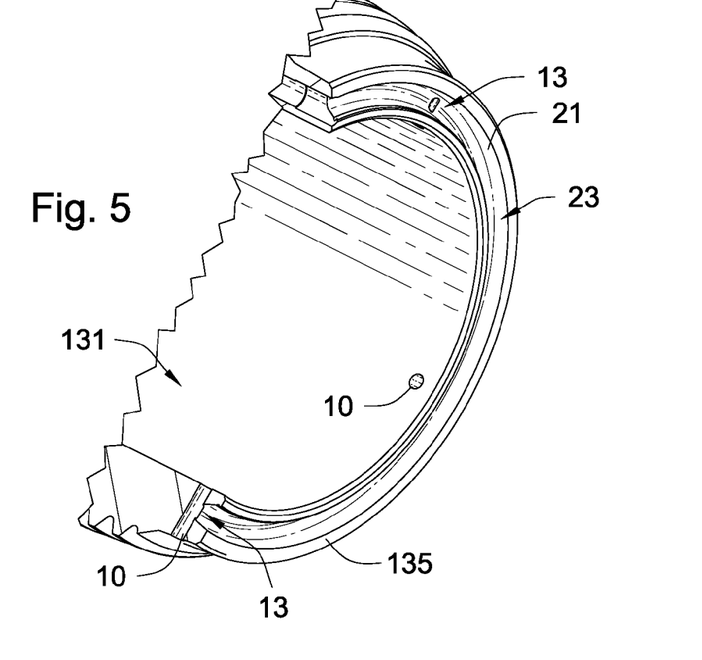
FIG. 5 is a cut away view of an alternate embodiment of the invention.
Figure 6:
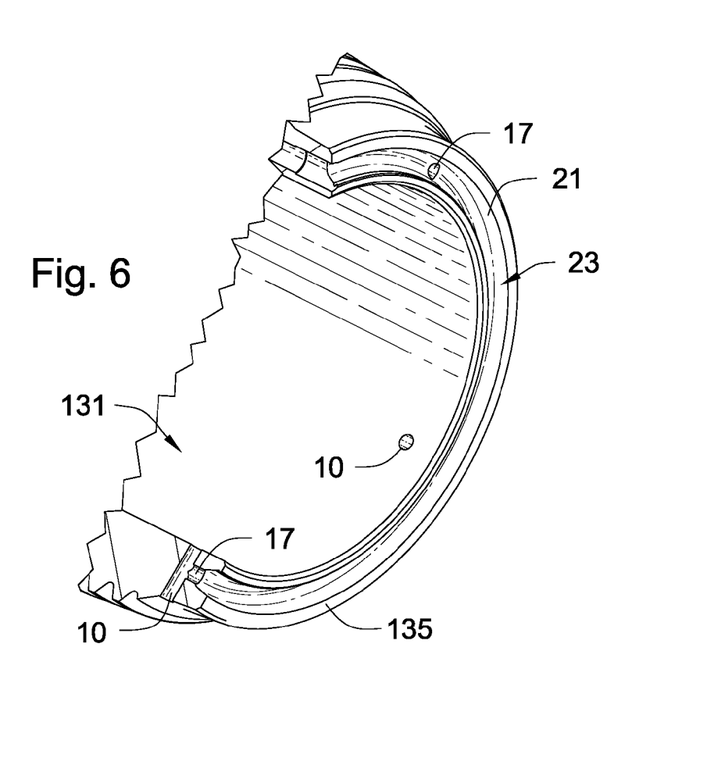
FIG. 6 depicts another embodiment of the present invention having a plurality of passageways formed in the pin nose section.

FIGS. 4 through 6 further define various embodiments of the invention. A cut away view illustrating the pin end 125 of the drill pipe without the data transmission element is shown in FIG. 4, the most preferred embodiment of the invention. A threaded end 123 including an inner region 131, exterior region 133, and mating surface 135 are a part of the pin end 125. A cavity 21 is formed in the mating surface 135 wherein a data transmission element is disposed. A volume 23 of the cavity is displaced by the data transmission element which will be shown in greater detail in later figures. At least one passageway 10 is formed in the threaded end 123 and is consequently in fluid communication with the interior and exterior regions 131 and 133. Most preferably the threaded end has four passageways formed generally equally apart from the each other in a circumferential direction around the threaded end. This can be done through various methods the most preferred of which is drilling four holes through the threaded end.

An axially oriented passageway 137 is formed in the downhole component 102 which is fluid communication with the cavity 21 and the interior region 131. The passageway is formed generally along the longitudinal axis of the threaded end and shaped to house the coaxial cable (not shown). A second passageway 15 is formed in the threaded end of the pin end and is in fluid communication with the axially oriented passageway 137 and at least on of one of the interior and exterior regions 131 and 133 respectively. In the preferred embodiment as shown, the second passageway 15 is in fluid communication with the exterior region 133. Because copious amounts of lubricant or thread dope are applied to the thread end upon make up, the thread dope may fill up the passageway and cause pressure build up. The second passageway allows venting of the thread dope thus decreasing the pressure in the thread end. A more detailed discussion regarding this phenomenon is discussed below.

Other embodiments of the invention are shown in FIGS. 5 and 6 which are close up cut away views of the threaded end of a downhole component. In FIG. 5 the passageway 10 is formed in the threaded end 123 such that it partially intersects the cavity 21 formed in the mating surface 135. The intersection of the passageway 10 and cavity 21 forms an opening 13 thus causing the passageway to be in fluid communication with not only the interior and exterior regions 131 and 133, but also the cavity 21. Another embodiment shown in FIG. 6 shows a third passageway 17 formed in the cavity 21. The passageway 10 is again in fluid communication with the cavity 21 by means of the third passageway 17. Thus the cavity 21 is in fluid communication with both the interior and exterior regions by means of the passageway 10 and third passageway 17.

Turning now to FIG. 7 a "made-up" box and pin end in a cut away view is shown. The box and pin ends are modified according to the most preferred embodiment of the invention as shown in FIG. 4. A coaxial cable 50 is disposed in the passageway (not shown) and electrically connected to the data transmission element 70. The second passageway 15 is shown in fluid communication with the passageway and thus the coaxial cable 50 and date transmission element 70. The passageway 10 is in fluid communication with the internal region 131 and the external region 133. The external region 133 is found between the threaded ends of the box and pin end 120 and 125 in this embodiment of the invention.

Figure 8:
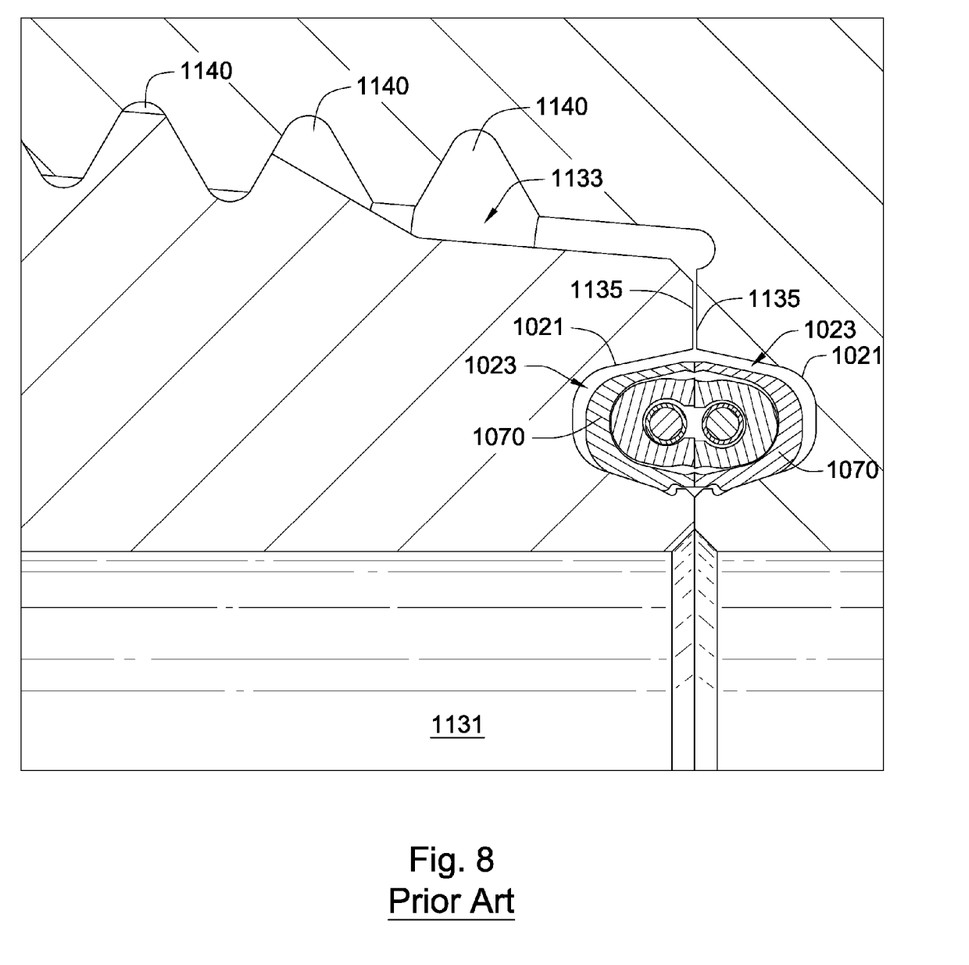
FIG. 8 is an enlarged cross sectional view of prior art data transmission elements disposed in the cavities of a box and pin end of a typical drill pipe when "made-up".
Figure 9:
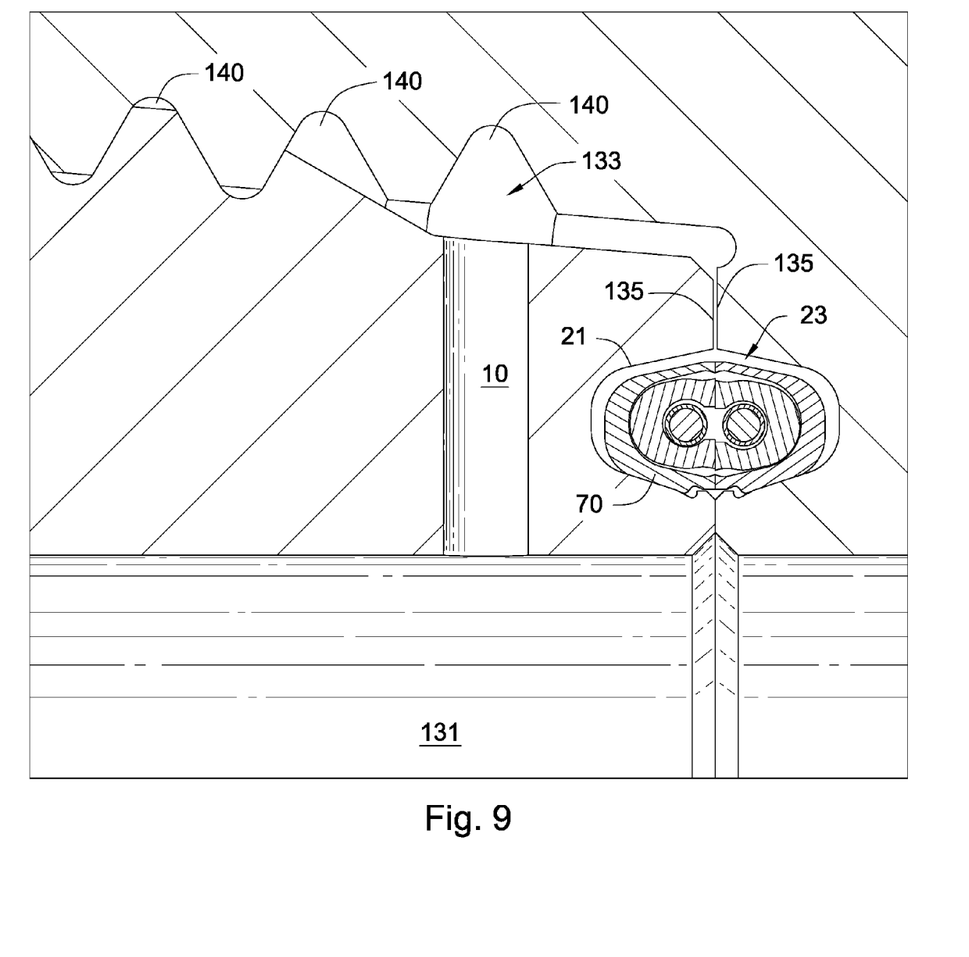
FIG. 9 is close up cross sectional view of the data transmission elements disposed in the cavities of a box and pin end of a drill pipe modified according to the present invention when "made-up".

A close up cross sectional view of a "made up" box and pin end is shown in FIG. 9. FIG. 8 shows a typical prior art box and pin end for comparison to the preferred embodiment of the present invention shown in FIG. 9.

When a box and pin end of a drill pipe of the prior art are "made-up", the threaded ends are intimately engaged to attach the two pipes together. As the threads come together voids 1140 formed between the threads create an annular volume that fills with lubricant such as thread dope. Copious amounts of thread dope are often applied to the threaded end of a downhole component 102 before two such components are made up. Typical types of thread dope are Copper filled grease or Teflon filled grease. As the annular volume between threads in the pin and box end decreases upon make up, the thread dope increases pressure. Eventually the pressure builds up behind the transmission elements 1070 possibly causing them to frictionally load very tightly against each other, and ultimately may cause the frictional load to exceed the strength of the data transmission element, which leads to rotational failure of the data transmission element. This may be especially the case if the mating surfaces 1135 do not come in complete intimate contact thus allowing thread dope to permeate the cavity 1021 and fill the volume 1023 increasing the pressure behind the data transformer elements 1070 between the exterior region 1133 and interior region 1131.

Turning to FIG. 9, the effects of the venting passageways of the present invention to relieve the pressure caused by the thread dope trapped between the threads upon make up of the tool joints is demonstrated. A passageway 10 in fluid communication allows thread dope to pass freely between the exterior region 133 and interior region 131 thus relieving pressure build up of the thread dope in the voids 140. It also relieves pressure in the cavity 21 from thread dope filling the volume 23 and any subsequent pressure build up on the data transmission element. This is especially beneficial as the data transformer elements are preferably biased when placed in the cavity but are movable and thus change the displaced volume of the cavity as it moves. The ability to move freely can create a pressure pump without out the passageway formed in the threaded region of the pipe. With the passageway however, the data transmission elements are able to move freely and close any gap between them thus increasing the efficiency of data transmission elements.

Figure 10:
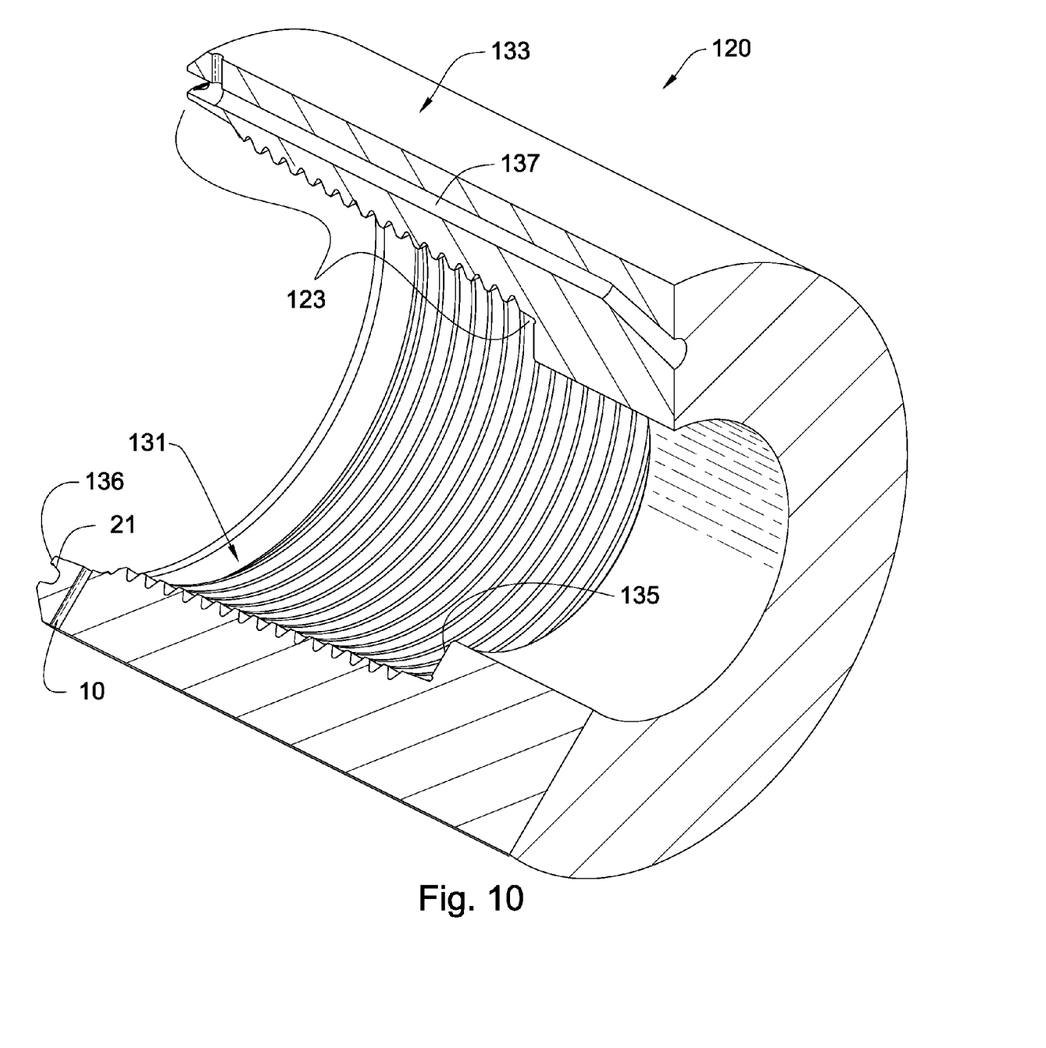
FIG. 10 is a cut away view of a tool joint on a box end of a drill pipe modified according to the present invention.

FIG. 10 shows another embodiment of the invention as placed in a box end of a drill pipe. A threaded end 123 on box end 120 includes an interior region 131, an exterior region 133, and a mating face 136. A cavity 21 if formed in the mating face 136 in which a data transmission element (not shown) is disposed. A passageway 10 is formed in the threaded end of the box end 120 and is in fluid communication with the interior region 131 and exterior region 133. A second passageway 15 is in fluid communication with an axially oriented passageway 137 and the exterior region 133. The axially oriented passageway 137 is in fluid communication with the cavity 21 and the interior region 131. When a box end modified according to this embodiment of the invention is made up with a pin end, the thread dope is allowed to pass between the interior and exterior regions and the passageway and the exterior region thus relieving any pressure build up of the thread dope upon make up.

Whereas the present invention has been described in particular relation to the drawings attached hereto, it should be understood that other and further modifications apart from those shown or suggested herein, may be made within the scope and spirit of the present invention. It is therefore intended that the foregoing detailed description be regarded as illustrative rather than limiting, and that it be understood that it is the appended claims, including all equivalents, that are intended to define the spirit and scope of this invention.

The invention claimed is:

1. A downhole component adapted for transmitting downhole data, the component comprising: a data transmission element and an elongate, generally tubular body with a threaded end, the threaded end having an interior region, an exterior region, and a mating surface; a cavity formed in the mating surface of the threaded end, wherein the data transmission element is disposed in the cavity and at least partially displacing a volume of the cavity, and; at least one passageway formed in the threaded end in fluid communication with the interior and exterior regions; wherein a second passageway formed in the threaded end is in fluid communication with an axially oriented passageway in the downhole component and at least one of the interior and exterior regions.

2. The downhole component of claim 1 wherein the axially oriented passageway is in fluid communication with the cavity and at least one of the interior and exterior regions.

3. The downhole component of claim 1 wherein the passageway is in fluid communication with the cavity.

4. The downhole component of claim 1 wherein a third passageway is in fluid communication with the cavity and the passageway.

5. The downhole component of claim 1 wherein the component has a plurality of passageways in fluid communication with the interior and exterior regions.

6. The downhole component of claim 1 wherein the data transmission element is movable and changes the displaced volume of the cavity as it moves.

7. The downhole component of claim 1 wherein the component is selected from the group consisting of drill collars, jars, heavy weight drill pipe, drill bits, and drill pipe.

8. A downhole component adapted for transmitting downhole data, the component comprising: a data transmission element and an elongate, generally tubular body with a threaded end, the threaded end having an interior region, an exterior region, and a mating surface; a cavity formed in the mating surface of the threaded end, wherein the data transmission element is disposed in the cavity and at least partially displacing a volume of the cavity, and; at least one passageway formed in the threaded end in fluid communication with the cavity, and at least one of the interior and exterior regions; wherein a second passageway formed in the threaded end is in fluid communication with an axially oriented passageway in the downhole component and at least one of the interior and exterior regions.

9. The downhole component of claim 8 wherein the axially oriented passageway is in fluid communication with the cavity and at least one of the interior and exterior regions.

10. The downhole component of claim 8 wherein an axially oriented passageway is in fluid communication with the cavity.

11. The downhole component of claim 8 wherein a third passageway is in fluid communication with the cavity and the passageway.

12. The downhole component of claim 8 wherein the component has a plurality of passageways in fluid communication with the interior and exterior regions.

13. The downhole component of claim 8 wherein the data transmission element is movable and changes the displaced volume of the cavity as it moves.

14. The downhole component of claim 8 wherein the component is selected from the up consisting of drill collars, jars, heavy weight drill pipe, drill bits, and drill pipe.

* * * * *